United States Patent Office 3,494,475
Patented Feb. 10, 1970

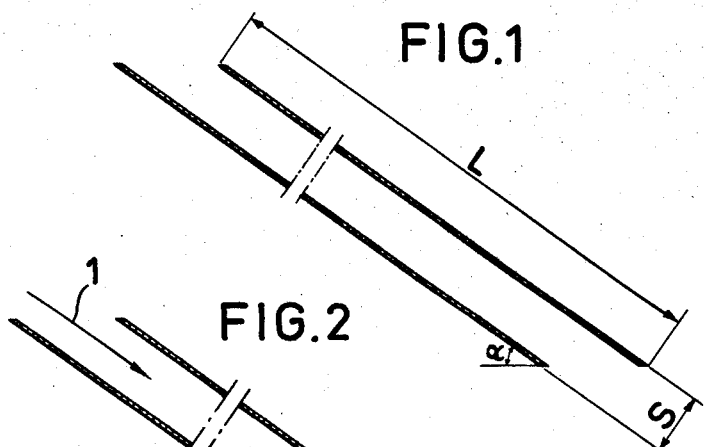
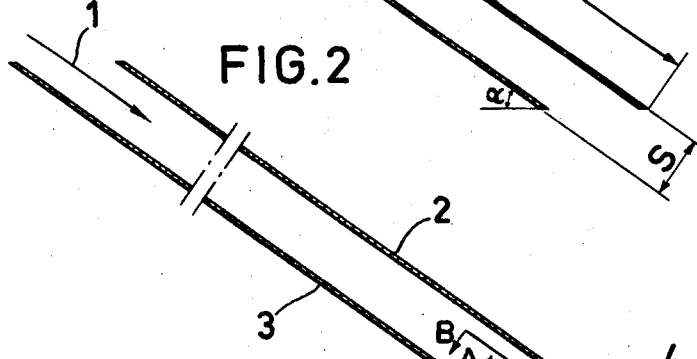
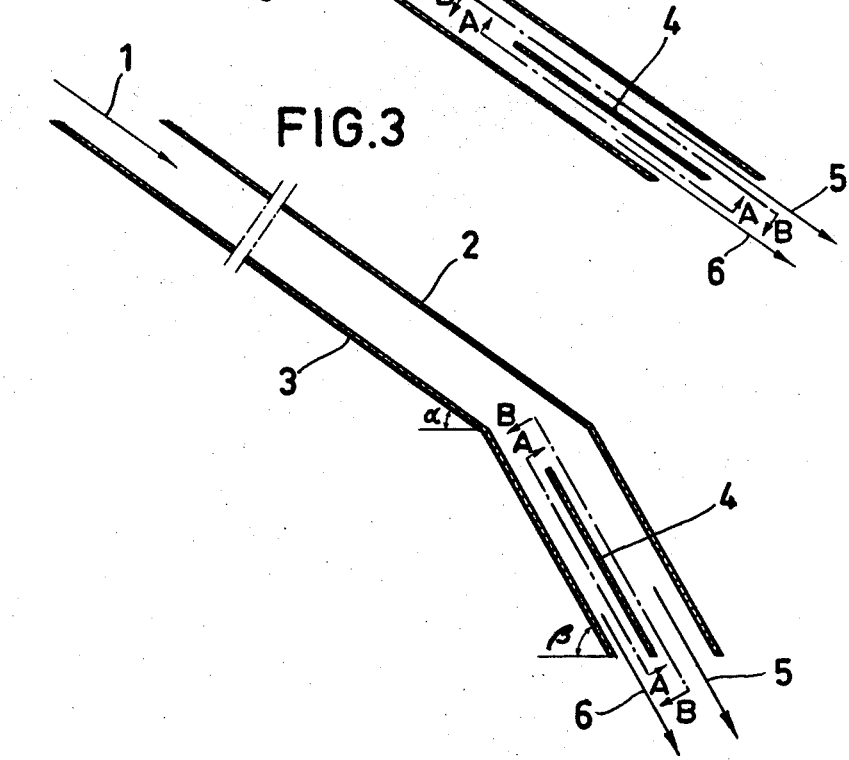

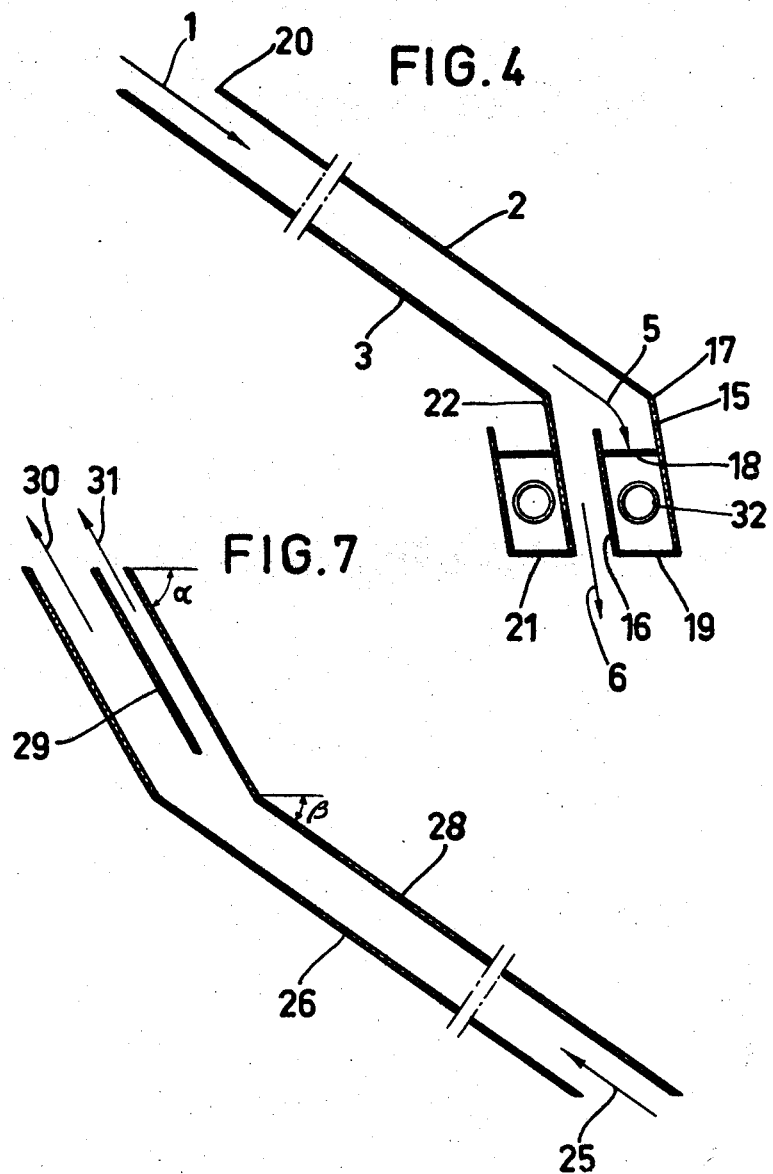

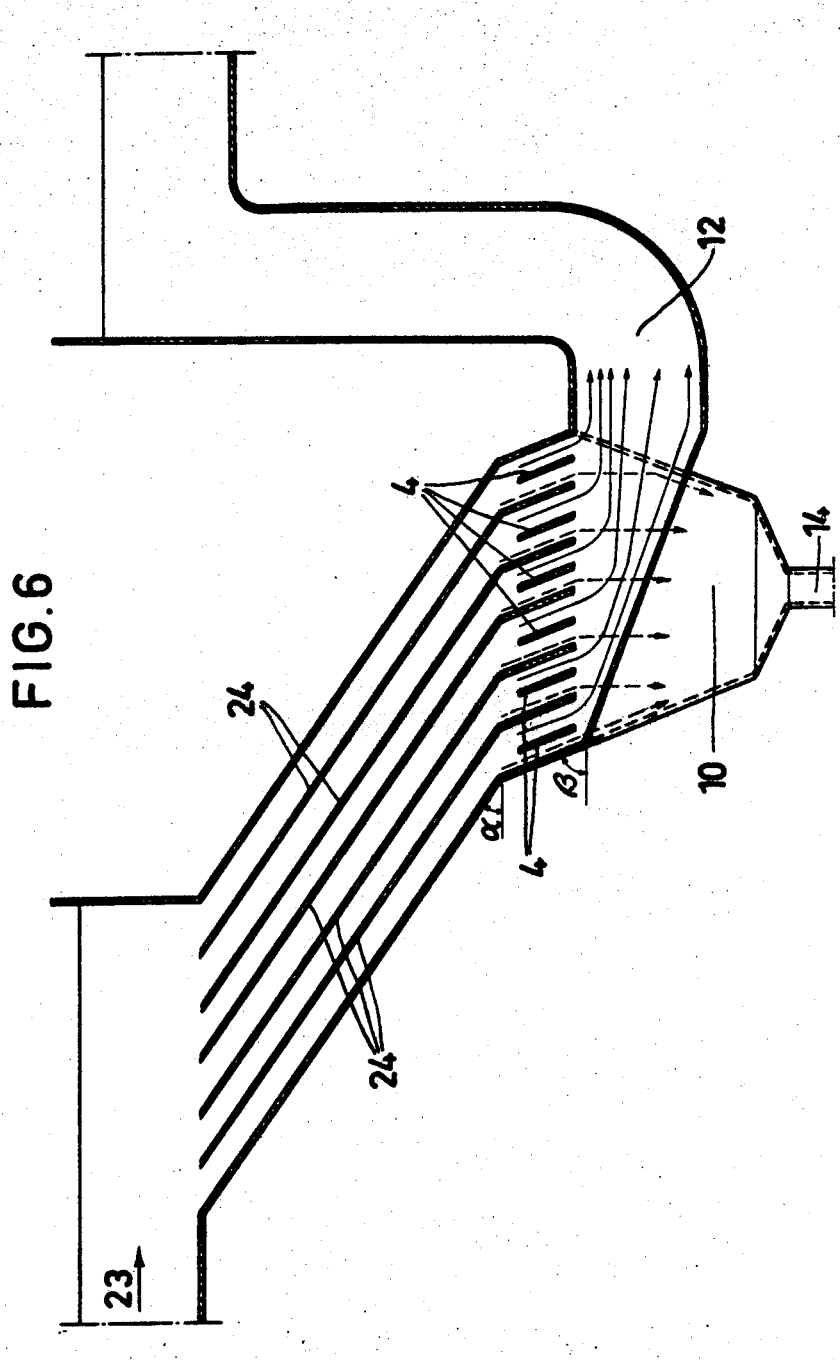

3,494,475
ARRANGEMENT FOR SEPARATING MATERIAL
SUSPENDED IN LIQUID
Bengt Hedström and Jan O. Hjort, Goteborg, Sweden, assignors to Rederiaktiebolaget Nordstjernan, Nynashamn, Sweden, a Swedish joint-stock company
Filed Mar. 12, 1968, Ser. No. 712,531
Claims priority, application Sweden, Mar. 13, 1967, 3,469/67
Int. Cl. B01d 21/00
U.S. Cl. 210—521
13 Claims

ABSTRACT OF THE DISCLOSURE

The present application discloses the arrangement of separating materials suspended in liquid, comprising substantially plane guide plates or disks so arranged in spaced relationship with each other and inclined in relation to the horizontal plane, that in every space between adjacent disks is formed a basic separation unit, characterized in that an inlet for the suspension to be cleaned is provided at one end of the disks, that separation takes place between substantially parallel disks with separated phase as well as clarified liquid flowing in the same direction, and that separate outlets for the separated phase and the clarified liquid respectively are provided at the other end of the substantially parallel disks.

---

Figure 5A:
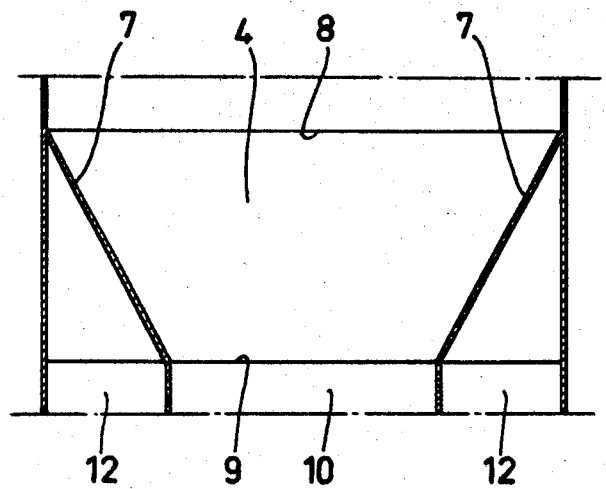

This invention relates to an arrangement or apparatus for continuously separating material suspended in a liquid. The apparatus is constructed for the sedimentation processes carried out in water supply and sewage disposal technology, but may generally be applied in industry for most of the sedimentation processes with free sedimentation or in which the difference in density between the phases to be separated is small. The apparatus can also be applied in the flotation and separation of particles having a lower density than the surrounding liquid.

In water supply and sewage disposal technology, sedimentation conventionally is carried out in basins of circular, square or rectangular shape. The main flow direction in the basins may be horizontal or vertically upwardly. The basins with horizontal flow may be provided with one or several intermediate bottoms for increasing the sedimentation area. The slurry sediment in the sedimentation basins is transported by scrapers to a slurry bin from which it is pumped out. All of these basin types have the characterizing feature in common that they require a very great building volume.

It is known that inclined guide plates or disks arranged in a sedimentation basin improve the sedimentation capacity. This idea also has been utilized in water supply and sewage disposal technology. The ingoing suspension is supplied at the lower end of the parallel disks, whereafter the suspension flows out between the disks. The suspended material settles on the upper surface of the disks, and by its own weight, slides down against the flow direction of the water and is collected below the lower end of the disks. For enabling the settled phase by its own weight to slide down along the upper surface of the disks, it is recommended that the inclination of the inclined disks to the horizontal plane, at normal flow velocity of the water, be 55°. This construction involves a considerable reduction of the building volume compared with conventional sedimentation in basins. The apparatus, however, still requires a great volume and the disks have a low sedimentation capacity.

According to Swedish patent specification 199,310, in a similar apparatus throttlings have been made in the outlets from every flow passageway for obtaining uniform distribution on and to the different spaces between the guide plates (flow passageways).

It is characteristic for these previously proposed arrangements, that in every basic sedimentation unit, i.e. in the space between two adjacent disks, the flow is directed upwardly, that the clarified liquid phase is discharged at the upper end of the basic sedimentation unit and the settled phase is discharged at the lower end thereof. The two separated phases are discharged each at its end of the basic sedimentation unit.

According to a different construction, the guide plates are formed by the shell surfaces of concentric cones standing on their base and placed one upon the other. The ingoing suspension is supplied via a throttling at the center and flows in every second space between two guide plates downwards along the guide plates. At the lower edge of the guide plates the clarified water is discharged via throttlings to the space located next above between two guide plates, where it flows in the opposite direction. The separated sludge settles in the space between the circumference of the guide plates and the container walls on the container bottom, from which it is pumped out. This apparatus, owing to the downwardly directed flow, can operate with less inclination of the guide plates. Among its disadvantages can be mentioned, that the central pipe, which is required for distributing the suspension being supplied and for discharging the outgoing clarified liquid, is a complicated and expensive construction. As only every second space between two guide plates is utilized for the sedimentation, the sedimentation capacity per guide plate is low and a great building volume is required. Possible flocks, furthermore, are broken down by the throttlings at the inlet.

The basic sedimentation unit in this case are the two spaces formed between three adjacent guide plates. In the lower of said spaces the sedimentation takes place, while the upper space serves for the discharge of clarified liquid. The two separated phases are discharged each at its end of the basic sedimentation unit.

An apparatus according to U.S. patent specification 1,190,863 operates with a downwardly directed flow in half the number of spaces between the guide plates and an upwardly directed flow in the remaining spaces. The suspension being supplied flows at first downwards in the spaces between the guide plates in half the package of guide plates. Below the guide plates the suspension turns and flows upwards in the spaces between the remaining guide plates in the package of guide plates. Several of such arrangements are connected in series one after the other. The phase settled on the guide plates flocculates to lumps, which slide down along the guide plates. Below the guide plates, said lumps may settle on the bottom in that space in which the suspension changes the direction of flow. Hereby the sludge forcefully is taken along. The apparatus, which comprises a number of sedimentation units connected in series, requires a great volume and utilizes the sedimentation surfaces in an inefficient way.

In that part where the suspension flows downwards along the guide plates, the settled phase and the phase of clarified liquid are discharged at the same end of the basic sedimentation unit. As the phases are discharged together, a new sedimentation must be carried out in the space below the guide plates. In that part where the suspension flows upwards, clarified liquid and settled phase are discharged each at its end of the basic sedimentation unit.

Previously known sedimentation apparatus provided with disks, thus, are characterized in that the separated phases are discharged separately each at its end of the basic sedimentation units, or together at the same end of the basic sedimentation unit.

The present invention is based on a thorough theoretical analysis of factors affecting the sedimentation capacity of the disks, the building volume required and the sludge transport on the disks. The invention more particularly relates to an arrangement for the separation of material suspended in a liquid, comprising substantially plane guide plates or disks so arranged in spaced relationship with each other and inclined in relation to the horizontal plane, that in every space between adjacent disks is formed a basic separation unit. The term substantially plane disks is to be understood, to include corrugated disks or disks which for strength reasons are slightly bent.

The invention is substantially characterized in that an inlet for the suspension to be clarified is provided at one end of the disks, that the separation is carried out between substantially parallel disks with the separated phase as well as the clarified liquid flowing in the same direction, and that separate outlets for the separated phase and the clarified liquid respectively are provided at the other end of the substantially parallel disks.

The term substantially parallel disks also covers a wedge-shaped intermediate space, so that a variable cross-sectional flow area is obtained, the voltage angle of which, however, must be small.

In an arrangement according to the present invention for separating material suspended in a liquid by sedimentation, the inlet is provided at the upper end of the substantially parallel disks, and the separate outlets are provided at the lower end of said disks. During flow downwards between the disks, the suspended phase settles on the upper surface of the disks, so that it is possible to distinguish in the area of the lower edge of the disks a gradually clearer border surface between two flows, viz a clarified liquid flow and below the same a flow of settled phase sliding on the upper surface of every disk.

In the aforesaid arrangement for separation by sedimentation, in the lower portion of every basic separation unit preferably is provided a separation plate immediately above the boundary surface between said two flows, for directing said flows to separate outlets. By a suitable control of the drain from the space above and below said separation plate, respectively, in every basic separation unit, the process can so be controlled that the settled phase is discharged through the lower space and the clarified liquid through the upper space.

In an arrangement according to the present invention for the separation of material suspended in a liquid and having a lower density than the liquid, for example, flotation, the inlet is provided at the lower end of the substantially parallel disks, and the separate outlets are provided at the upper end of said disks. A separation plate preferably is provided in the upper portion of every basic separation unit below the boundary surface between the separated phase and the clarified liquid flowing below said phase, for directing the separated phase and the clarified solution, respectively, to the respective outlet.

For separation processes in which great amounts of liquid are to be treated, for example, in public sewage purification works, the object, of course, must be to make the separation apparatus so effective, that the necessary separation can be effected by an apparatus of reasonable volume.

The capacity of the separation apparatus, of course, depends on the total disk area and, thus, can be increased by increasing the number of disks within the given volume. In this respect, a limit is set by the fact that there must be a certain normal distance between the disks. This minimum distance depends on the properties of the suspended particles. In practice the minimum normal distance should vary between about 7 cm. and about 0.5 cm.

Theoretically, however, it can be derived that, for example, for sedimentation between inclined disks, it is not the total surface of the disks which is the dimensioning surface, but the surface of the disks projected on the horizontal plane, corrected by a term for certain geometric conditions at the ends of the disks.

Said corrective term depends on the flow direction of the suspension being supplied. L being the length of the disks, B the width, $s$ the normal distance, $\alpha$ the inclination to the horizontal plane, and $n$ the number of disks, the dimensioning sedimentation surface $A_s$ is determined by the equation as follows $$A_s = n \cdot L \cdot B \cdot \cos \alpha \pm \left[ \frac{nsB}{\sin \alpha} \right] \quad (1)$$

where the plus sign applies to the suspension flow in a direction countercurrent to the transport direction of the sedimented phase, and the minus sign applies to a concurrent flow. The last term normally is small compared with the first term.

A measure of the geometric efficiency degree ($\eta_G$) is the dimensioning sedimentation surface divided through the surface of the disks.

$$\eta_G = \frac{A_s}{n \cdot L \cdot B} = \cos \alpha \left[ 1 \pm \frac{s}{L} \cdot \frac{1}{\sin \alpha \cdot \cos \alpha} \right] \quad (2)$$

The volume ($V$) of the space between the disks plus the volume of the disks is $$V = n \cdot L \cdot B (s+t) \quad (3)$$

where $t$ is the thickness of the disks.

The necessary building volume of the sedimentation part per surface unit of dimensioning sedimentation surface then is $$BV = \frac{V}{A_s} = \frac{s+t}{\cos \alpha} \cdot \left[ \frac{1}{1 \pm \frac{s}{L} \sin \alpha \cdot \cos \alpha} \right] \quad (4)$$

At a concrete dimensioning the necessary sedimentation surface according to Hazen's surface loading theory is $$A_s = Q/v_f$$

where $Q$ is the flow and $v_f$ is the sedimentation speed of the most slowly setting particles to be separated to 100%.

The necessary disk surface $A_L$ thereby becomes $$A_L = \frac{Q}{\eta_G \cdot v_f} = \frac{Q}{v_f \cdot \cos \alpha} \left[ \frac{1}{1 \pm \frac{s}{L} \cdot \frac{1}{\sin \alpha \cdot \cos \alpha}} \right] \quad (5)$$

and the necessary building volume of the sedimentation part $$V = \frac{Q(s+t)}{v_f \cdot \cos \alpha} \cdot \left[ \frac{1}{1 \pm \frac{s}{L} \cdot \frac{1}{\sin \alpha \cdot \cos \alpha}} \right] \quad (6)$$

All terms in parenthesis can be neglected without giving rise to great errors.

According to the invention, which also is based on this analysis, therefore, the inclination of the disks to the horizontal plane ($\alpha$) and the normal distance between the disks ($s$) shall be small, in order to obtain a small building volume. This also results in a high geometric efficiency degree of the disks.

The flow between the disks shall be laminar. To this end, it is necessary that the Reynolds number, $Re$, defined with the hydraulic diameter, $D_h$, as characteristic length shall be smaller than about 2000.

$$Re = \frac{v_m \cdot D_h}{\nu}$$

where:

$$D_h = \frac{2B \cdot s}{B+s}$$

and $v_m$ is the mean flow speed of the suspension and $\nu$ is the cinematic viscosity.

When the suspension being supplied flows upwards along the disks, the sliding of the sedimented phase downwards along the disks is counteracted by the suspension flowing in a countercurrent flow. For this reason, usually the normal distance between the disks is made great and the mean flow speed of the suspension is held low, so that at the boundary surface between sediment phase and clarified liquid small speed gradients (shearing forces) are obtained. For reducing the normal distance between the disks, in order to make the construction more compact, the inclination of the disks to the horizontal plane, instead, must be increased, which in its turn causes the geometric efficiency degree of the disks to decrease, as is shown above (Equation 2).

At sedimentation, the present invention presupposes the flow of the suspension being supplied to be directed downwards, i.e. the flow is concurrent with the transport direction of the sedimented phase and thereby contributes to the transport of the sedimented phase, thereby rendering it possible to give the disks less inclination to the horizontal plane.

During a downwardly directed flow of the suspension being supplied, the normal distance between the disks is reduced and the mean flow speed of the suspension being supplied is increased, the speed gradient and thereby the shearing stress between liquid and the sedimented phase at the boundary surface will increase. This contributes additionally to a facilitated transport of the sedimented phase downwards along the disks. Thereby, the inclination of the disks to the horizontal plane can be reduced still more.

A particle when it is in a flow field, is affected by a force directed in the direction of the speed gradient (at laminar flow between parallel disks against a plane directly in the middle between the disks). The upper limit for an improvement of the sliding transport of the separated phase is the position, in which the force acting upon the individual particle in the suspension, owing to the speed gradient, is so great, that the separation speed of the particle is greatly reduced.

When suspensions are being sedimented in which the particles included have such properties, that they agglomerate to flocks, this agglomeration is improved by increasing the speed gradients in the suspension to a certain limit. At still higher speed gradients the particle agglomeration is counteracted, because the flocks are broken up by shearing.

In the following, an embodiment of a sedimentation apparatus according to the invention is described, in which the aforesaid theoretical prerequisites have been applied.

The apparatus according to this embodiment relates to sedimentation apparatus of the type which comprises two main parts, viz a sedimentation tank and a sendimentation unit arranged in said tank.

The sedimentation tank is a container with a built-in sedimentation unit. The suspension being supplied is fed into the upper portion of the tank, and the sedimented phase is collected in a sludge pocket in the lower portion of the tank. The sludge pocket is continuously or intermittently emptied by a pump. The pump can be controlled by the sludge level in the sludge pocket or by definite time intervals. The clarified liquid is discharged through one or several outlet passages or outlet tubes which can be arranged below or to the side of the sedimentation tank.

The sedimentation unit is a combination of any desired number of assembled basic sedimentation units which hereinafter are called sedimentation elements.

The sedimentation elements in their turn can be divided into a sedimentation part in which the sedimentation proper takes place, and a discharge part for separate discharge of the clarified liquid and the sedimented phase.

Every sedimentation part can be regarded to be a box with an extension in substantially two dimensions. The box is defined by two parallel sides (disks) inclined to the horizontal plane and two vertical sides. The vertical sides constitute the side walls of the sedimentation tank. The length and width of the disks normally are considerably greater than the normal distance between the disks. The upper end of the box constitutes the inlet to the sedimentation element, and its lower open end is a transition to the discharge part.

In the sedimentation part the suspension flows downwards. The particles included in the suspension thereby sediment and settle on the upper side of the lower disk. The sedimented phase slides downwards along the disk, by its own weight and with the help of the liquid flowing in the same direction. At the lower end of the sedimentation part the sedimented phase slides on the upper surface of the lower disk, and in the space between the sliding sedimented phase and the upper disk flows the clarified liquid. These flows, which occur in the same space, advance into the discharge part where they are separated and discharged.

The discharge part has as its object to discharge the two flows in the sedimentation part each to its outlet and can be regarded to be an extension of the box-shaped sedimentation part. For this reason, a separation plate has been provided between the disks and in parallel with the same. The clarified liquid flows between the lower surface of the upper disk and the separation plate, and the sedimented phase slides down in the space between the separation plate and the upper surface of the lower disk.

The inclination of the disks to the horizontal plane in the discharge part can advantageously be made greater than in the sedimentation part. When in the discharge part the inclination of the disks to the horizontal plane is the same as in the sedimentation part, it is the inclination required for an effective sludge transport in the discharge part which determines the inclination of the disk to the horizontal plane. In the sludge space of the discharge part the clarified liquid stream does not contribute to facilitate the sludge transport. When the disks are inclined so as to have a greater inclination to the horizontal plane in the discharge part than in the sedimentation part, the sedimentation part can be dimensioned with the greatest possible geometric efficiency of the disks, at the same time as the transport of the separated phase in the discharge part is assured.

The streams of clarified liquid and sedimented phase respectively which come from every discharge part in a sedimentation unit, preferably shall be combined with corresponding streams in the other discharge parts of the unit to two main outlets.

In the following, two alternative embodiments of the discharge arrangement are described by way of example.

Alternative 1.—Discharge of clarified liquid at the side of the sedimentation unit In the space between the separation plate and the upper disk in the discharge part of every sedimentation element a tube is inserted, which is perforated in the entire portion located within said space through which the clarified liquid is discharged. The perforated tube, which implies a reduction of the flow cross-section and thereby so to say a throttling of the liquid flow, shall be placed a distance below the upper edge of the separation plate in order to prevent the contraction for the throttling from causing sludge to be taken along from the sedimentation part. The throttlings are so to be adjusted that a uniform drain is obtained from the entire width of the sedimentation element. The tube is drawn through the side of the sedimentation tank. The clarified liquid then can be discharged to an open passage or a tube to the side of the sedimentation tank.

The sludge in the space between the separation plate and the lower disk slides on the upper surface of the lower disk in the discharge part of every sedimentation element down into a sludge pocket located below the disks.

The solution shown in this alternative may practically also be so designed that the space, which is intended for the discharge of clarified liquid and located between the separation plate and the end portion of the upper disk in every sedimentation element, is shaped as a box having a tight bottom and openings in one or both end walls for outlet. One long side of the box is made slightly higher than the other long side. The disks are so placed in the sedimentation tank, that the lower edge rests upon the higher one of the long sides of the outlet box. The long sides of the outlet box may be vertical or inclined to the horizontal plane. The lower one of the long sides of the outlet box serves as separation plate.

In the outlet boxes, some distance from the upper edge, a perforated metal sheet is inserted so that a throttling of suitable size is obtained, and that a uniform drain from the entire width of the sedimentation element is effected. The clarified liquid is discharged from either or both of the short sides of the box through a pipe to an outlet passage or outlet tube which is common to all outlet boxes. The sludge separated on the upper surface of the disks slides down between the outlet boxes to a sludge pocket provided below the boxes.

Alternative 2.—Discharge of clarified liquid below the sedimentation unit

In the space between the separation plate and the lower disk in the discharge part of a sedimentation element are placed one or several guide plates in such a manner, that the slide surface of the sliding separated phase is reduced in width. The object of this is that the separated phase when it is leaving the discharge part shall sediment down into a sludge pocket located, for example, centrally below the disks.

In the space between the separation plate and the upper disk one or several guide plates so are inserted in the same manner, that the clarified liquid is led to outlet passages arranged, for example, at the side of the sludge pocket. In the space between the separation plate and the upper disk there also may be inserted a throttling, the object of which is to ensure a uniform drain from the individual sedimentation element.

Alternative 1 above can be understood as the insertion of a horizontal guide plate in the space between the separation plate and the upper disk in the sedimentation element.

Figure 5B:
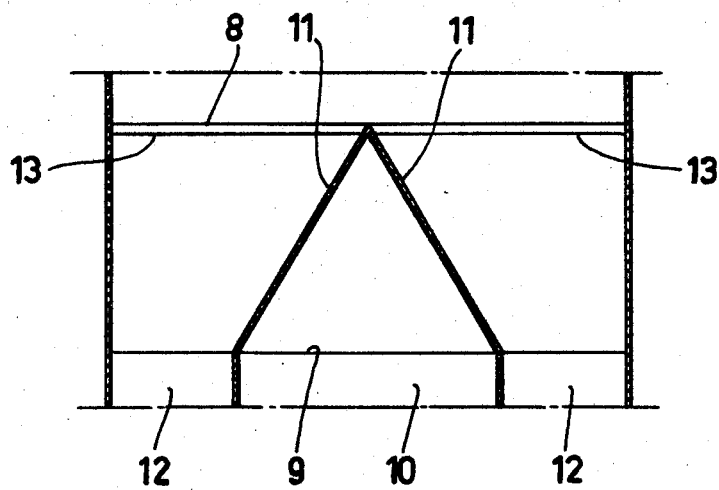

FIG. 1 a vertical cross-section of the sedimentation part in a sedimentation element, FIG. 2 a vertical cross-section of a sedimentation element in which the inclination to the horizontal plane of the disks in the sedimentation part and discharge part is the same, FIG. 3 a vertical cross-section of a sedimentation element in which the inclination to the horizontal plane of the disks in the discharge part is greater than in the sedimentation part, FIG. 4 a vertical cross-section, perpendicular to the disks, through a sedimentation element in which the discharge arrangements are made according to Alternative 1 above, FIGS. 5a and 5b the discharge arrangements made according to Alternative 2, FIG. 5a being a section (A—A in FIGS. 2 and 3 respectively) in parallel with and between the separation plate and the lower disk in the sedimentation element, and FIG. 5b being a section (B—B in FIGS. 2 and 3 respectively) in parallel with and between the separation plate and the upper disk in the sedimentation element, FIG. 6 a sedimentation unit comprising a group of sedimentation elements placed in one embodiment of the sedimentation tank, FIG. 7 the utilization of the same technique as described above for sedimentation at the separation of suspended material having a lower density or volume weight than the surrounding liquid.

FIG. 1 shows the narrow inclined box constituting the sedimentation part in a sedimentation element. In this figure the dimensional designations have been used which were used in the theoretical calculations in the introductory portion of the description. FIG. 2 shows a sedimentation element in which the inclination of the disks to the horizontal plane is the same in the sedimentation and discharge part, and FIG. 3 shows a sedimentation element in which the inclination of the disks to the horizontal plane is greater in the discharge part than in the sedimentation part.

In the embodiments shown in FIGS. 2 and 3, the suspension being supplied flows in the direction of arrow 1 in between the parallel disks 2 and 3. Hereby the particles included in the suspension sediment and settle upon the upper surface of the lower disk 3. The separated phase slides down along the upper surface of disk 3. This sliding transport is facilitated by the downwardly directed liquid stream. In this way are obtained in the lower portion of the sedimentation part a sliding phase of sedimented material and a phase of clarified liquid. These phases are to be discharged separately from the sedimentation apparatus. To this end the lower portion of the sedimentation element has been shaped as a discharge part. The disks in the discharge part either may have the same inclination to the horizontal plane as in the sedimentation part (FIG. 2), or a greater inclination to the horizontal plane (FIG. 3). A separation plate 4 so is placed in the discharge part that the clarified liquid 5 is discharged between the separation plate 4 and the upper disk 2, and the separated phase 6 slides down in the space between the separation plate 4 and the lower disk 3.

FIG. 4 shows the discharge of clarified liquid by outlet boxes. The sedimentation element is defined by the disks 2 and 3. The lower edge 17 of the disk 2 rests upon the higher long side 15 of the outlet box 19. The lower long side 16 of the outlet box 19 is placed on the same side of the higher long side 15 as the upper edge 20 of the disk 2. The lower disk 3 in the sedimentation element rests in the same way on the higher long side 22 of the adjacent outlet box 21. The lower one of the long sides 16 of the outlet box 19 must be approximately so high as to reach to a plane constituting an extension of the lower disk 3 in the sedimentation element. In the outlet box, some distance below the upper edge of the lower long side 16, a perforated metal sheet 18 is mounted, through which the clarified liquid is discharged from the entire width of the sedimentation element. On either or both short sides of the outlet box 19 are provided outlet pipes 32 through which the clarified liquid is discharged to outlet passages or outlet tubes. The number and placing thereof does not affect the construction.

The sedimentation phase slides on the upper surface of the lower disk 3 in the sedimentation element and down in the space between the outlet boxes 19 and 21. The lower long side 16 of the outlet box 19 serves hereby as a separation plate. The sedimented phase is collected in a sludge pocket below the sedimentation unit.

FIGS. 5a and 5b show an example how guide plates for sedimented phase and clarified liquid respectively may be arranged in the discharge part. In FIG. 5a which is a section between the separation plate 4 and the lower disk 3 (section A—A in FIGS. 2 and 3), it is shown how to obtain by two guide plates 7 a downwardly tapering sliding surface for the sedimented phase from the upper edge 8 of the separation plate to its lower edge 9 in the discharge part. The sedimented phase is collected in a sludge pocket 10 below the thus tapering sliding surfaces in the sedimentation unit.

In FIG. 5b which is a section between the separation plate 4 and the upper disk 2 (section B—B in FIGS. 2 and 3), it is shown how in an analogous way by two guide plates 11 is effected a discharge of the clarified liquid to two outlet passages 12, in this example arranged to the side of the sludge pocket 10. At 13 a throttling can be inserted for ensuring a uniform drain from the entire width of the sedimentation part. From the sludge pocket the sedimented phase is pumped out continuously or intermittently. The arrangement with guide plates can be varied in many ways. The outlet passages for clarified liquid may be one or several in number.

In FIG. 6 is shown a way of placing the sedimentation unit in a sedimentation tank. The suspension being supplied is at 23 fed into an inlet box. From here the suspension is uniformly divided between the disks 24, which here are bent at their lower ends. The separation plates 4 separate the clarified liquid from the sedimented phase. The sedimented phase slides as indicated by the dashed arrows and is collected in the sludge pocket 10 below the disks whilst the clarified liquid in the direction of the through arrows is discharged through the outlet passages 12.

The sedimented phase is pumped out at 14. The guide plates are not shown. In this figure the inclination of the disks to the horizontal plane in the sedimentation part is drawn 35° (angle $\alpha$) and in the discharge part 70° (angle $\beta$). The inclination $\beta$ to the horizontal plane in the discharge part normally shall exceed 45°, while the inclination $\alpha$ in the sedimentation part depends on the friction of the sedimented phase against the disks, on the density and on the effect of the liquid friction.

The sedimentation apparatus according to the present invention can be so constructed that it has no movable parts. If desired, the apparatus can be completed by vibration units for facilitating the sliding transport of the sludge and to prevent cloggings. These vibration units may be mounted either on the sedimentation unit or on the sedimentation tank.

The sedimentation unit can substantially be manufactured of any material which does not solve or to a higher degree corrode in the liquid to be treated in the sedimentation apparatus. It is preferably made of steel metal sheet, steel alloy, plastic material or of any combination of these materials.

The disks inclined to the horizontal plane in the sedimentation unit may be plane or provided with corrugations extending in the longitudinal direction. The corrugation theoretically does not render any positive effect on the sedimentation, but decreases the hydraulic diameter, $D_n$, comprised as a factor in Equation 7. The disks also may be given wedge-shape, so that a variable flow cross-sectional area is obtained in the sedimentation elements. The wedge angle, however, must be small. For strength reasons, the disks may also be slightly bent.

The sedimentation tank may be of any suitable construction. It may be manufactured of, for example, wood, concrete, steel metal sheet, steel alloy, plastic material or any combination of such materials.

When the sedimentation apparatus is to be employed in a process with great load variations, a construction is to be preferred in which the apparatus comprises several sedimentation units, which individually can be connected and disconnected by hand or by a control method known to the expert.

It is well known that the sedimentation properties of the particles in a suspension are affected by a number of variables. In many cases the sedimentation properties are influenced radically, for example, by the addition of certain chemicals which increase the flocculation degree of the solid particles. These chemicals affecting the sedimentation properties in a positive way should, of course, be utilized with the best possible economic effect for increasing the sedimentation capacity also of an apparatus according to the invention. Where this chemical addition is to be made, depends on the nature of the suspension and on the properties of the chemical in question.

It is known that the return of sludge from the sedimentation step to the precipitation step in the purification of raw water (for the production of clean water) by aluminum or iron hydroxide flocks can improve the flocks obtained in the coagulation step, at the same time as the consumption of chemicals is reduced. By means of the sedimentation apparatus described in the present invention a relatively short duration of stay of the sludge in the apparatus can be obtained, which in this case is favorable. In active sludge processes there will be a smaller risk that anaerobic conditions are caused in the sludge, when the sludge has a short duration of stay in the apparatus.

In a sedimentation apparatus provided with disks, after a period of operation, there will develop deposits and biological vegetation on the surface in the sedimentation unit. Hereby the friction between the sliding sedimented phase and the disks is increased. The sedimentation part can be cleaned most easily by a broad brush mounted on a long handle. The brush shall have brushes on the upper and lower surface. Its width shall be made equal to the width of the sedimentation element, and its thickness somewhat greater than the normal distance between the disks. The design of the cleaning means for the discharge part depends on the construction of the discharge arrangement. If the inclination of the disks to the horizontal plane is the same in the sedimentation part and in the discharge part, the discharge part can be cleaned by straight brushes. If the inclination of the disks to the horizontal plane is greater in the discharge part than in the sedimentation part, a certain deposit on the surfaces in the discharge part can be accepted without thereby appreciably affecting the operation of the apparatus. The cleaning can be made with flexible brushes. Cleaning with brushes can be carried out with the apparatus in operation. The apparatus can also be emptied and cleaned by flushing with fixed or displaceable nozzles. The apparatus, of course, may also be provided with special cleaning doors.

In a conventional sedimentation basin with a mean depth of 2.5 m. the necessary building volume is 2.5 m.$^3$/m.$^2$ dimensioning sedimentation area.

For sedimenting in apparatus with inclined disks, the necessary building volume for the sedimentation part can be calculated according to Equation 4. In this building volume are not included inlet and outlet arrangements and sludge pocket. When also these volumes are included, the necessary building volume calculated from Equation 4 must be multiplied by a factor of the magnitude 2.

In a known test apparatus for sedimentation between inclined disks where the flow is upwardly directed between the disks, the inclination of the disks to the horizontal plane is $\alpha=55°$. The normal distance between the disks is 0.082 m. The disks have a length of 1.68 m. This renders the geometric efficiency degree of the disks $\eta_G=0.636$ and the necessary building volume of the sedimentation part $BV=0.132$ m.$^3$/m.$^2$. The thicknes of the disks was here assumed with 0.002 m. These apparatus parameters refer to a construction employed in the sedimentation step subsequent to chemical precipiation of raw water.

Practical sedimentation tests with a sedimentation apparatus constructed according to the present invention and comprising one sedimentation element have been carried out on a municipal waste water which had passed through a conventional sand trap. Hereby it was shown that at downwardly directed flow between the disks the sludge transport on the disks can be effected, when the inclination of the disks to the horizontal plane is $\alpha=35°$ or even less. The normal distance between the disks here has been 0.020 m. and the length of the disks 2.0 m. At $\alpha=35°$, $L=2.0$ m. and $S=0.020$ m. the geometric efficiency degree of the disks is $\eta_G=0.802$ and the necessary building volume of the sedimentation part $BV=0.0274$ m.$^3$/m.$^2$. In these calculation the thickness of the disks has been assumed with 0.002 m.

The same technique as described above for sedimentation can be applied to flotation and separation of particles having a lower density than the surrounding liquid (see FIG. 7). When a suspension including particles with lower density or volume weight flows between parallel disks 26, 28 inclined to the horizontal plane, the particles included in the suspension are separated at the lower surface 28 of the upper disk. The sludge thus separated shall slide upwardly along the disks and be collected at their upper ends.

The liquid flow 25, for facilitating in this case the sliding transport of the sludge, shall be upwardly directed between the disks. The discharge of the clarified liquid from the sliding separated phase is made in the same manner as at sedimentation with a separation plate 29. The clarified liquid 30 is discharged from the space between the separation plate 29 and the lower disk 26 in the discharge part to an outlet passage or outlet tube in a way analogous to that at sedimentation. The separated sludge 31 is discharged from the space between the separation plate 29 and the upper disk 28 in the discharge part to the space above the upper end of the discharge part.

Hereby guide plates may be applied for collecting the sludge on a smaller portion of the width of the disks. For the same reason as at sedimentation, the inclination of the disks to the horizontal plane can be made greater in the discharge part than in the flotation part. In flotation processes the apparatus preferably may be connected to vacuum so as to produce larger gas bubbles, which improves the flotation properties.

What we claim is:

1. An apparatus for separating material suspended in a liquid comprising a plurality of separation units formed by a plurality of substantially parallel guide plates arranged in inclined relation with respect to a horizontal plane so that adjacent plates form an independent unit therebetween, one end of each unit including inlet means for the suspension and the other end of each unit including dividing means disposed between said parallel guide plates forming outlet means for discharging the separated phase to a first receptacle means and separate outlet means for discharging the clarified liquid to a second receptacle means, whereby separation takes place in each unit independent of the other units and during flow in the same direction of both the separated phase and the clarified liquid.

2. An apparatus as defined in claim 1 wherein the inlet means is provided at the upper end of each unit and both of the outlet means are provided at the lower end of each unit, whereby suspended material having a higher density than the liquid can be separated.

3. An apparatus as defined in claim 2 wherein said dividing means comprises a dividing-plate, said plate being mounted in the lower portion of each unit for discharging the separated phase and the clarified liquid to their respective outlets.

4. An apparatus as defined in claim 2 wherein the lower portion of each unit has a greater inclination to the horizontal plane than the upper portion thereof.

5. An apparatus as defined in claim 2 wherein each unit includes a substantially U-shaped outlet box for the clarified liquid comprising a first wall member extending downwardly from one of the guide plates of each unit, a second wall member projecting transversely from the first wall member toward the interior of each unit, and a third wall member extending upwardly from the second wall member, whereby the separated phase is discharged between the other guide plate of each unit and the third wall portion and the clarified liquid is discharged through the outlet box, 6. An apparatus as defined in claim 5 wherein the third wall member forms a dividing-plate for discharging the separated phase and the clarified liquid to their respective outlets.

7. An apparatus as defined in claim 2 wherein a guide means is mounted between the dividing-plate and the lower plate of each unit and extends angularly toward the interior of the unit so as to provide a downwardly decreasing space for the discharge of the separated phase.

8. An apparatus as defined in claim 2 wherein a guide means is mounted between the dividing-plate and the upper plate of each unit and extends angularly toward the exterior of the unit so as to guide the clarified liquid toward the outlet.

9. An apparatus as defined in claim 1 wherein the inlet means is provided at the lower open end of each unit and both of the outlet means are provided at the upper end of each unit, whereby suspended material having a lower density than the liquid can be separated.

10. An apparatus as defined in claim 9 wherein said dividing means comprises a dividing plate, said plate being mounted in the upper portion of each unit for discharging the separated phase and the clarified liquid to their respective outlets.

11. Apparatus according to claim 9 wherein the upper portion of each unit has a greater inclination to the horizontal plane than the lower portion thereof.

12. An apparatus as defined in claim 2 wherein each unit includes a lower guide plate and said dividing means comprises a dividing plate, said lower guide plate and dividing plate being mounted in the lower portion of each unit for discharging the separated phase and clarified liquid to their respective outlets and a guide means mounted between the dividing plate and the lower guide plate of each unit extending angularly toward the interior of the unit so as to provide a downwardly decreasing space for the discharge of separated phase.

13. An apparatus as defined in claim 2 wherein each unit includes an upper guide plate and said dividing means comprises a dividing plate, said upper guide plate and dividing plate being mounted in the lower portion of each unit for discharging the separated phase and the clarified liquid to their respective outlets, and a guide means mounted between the dividing plate and the upper guide plate of each unit extending angularly toward the exterior of the unit so as to guide the clarified liquid toward the outlet therefor.

References Cited

UNITED STATES PATENTS

| | | | |
|---|---|---|---|
| 650,138 | 5/1900 | Smith | 209—443 |
| 1,811,408 | 6/1931 | Stebbins | 209—157 X |
| 2,429,925 | 10/1947 | Clifford | 209—157 |

JAMES L. DECESARE, Primary Examiner

U.S. Cl. X.R.

209—157

PO-1050
(5/69)

UNITED STATES PATENT OFFICE
CERTIFICATE OF CORRECTION

Patent No. 3,494,475          Dated February 10, 1970

Inventor(s) Bengt Hedstrom and Jan O. Hjort

It is certified that error appears in the above-identified patent and that said Letters Patent are hereby corrected as shown below:

Column 3, line 22, "voltage" should be -- wedge --;

Column 5, line 11, "At" should be -- During --;

Column 7, between lines 43 and 44, insert the following paragraph -- In the accompanying drawings show --;

Column 10, line 47, "thicknes" should be -- thickness --;

Column 10, line 50, "precipiation" should be -- precipitation --

SIGNED AND
SEALED
JUL 21 1970

(SEAL)
Attest:

Edward M. Fletcher, Jr.
Attesting Officer

WILLIAM E. SCHUYLER, JR.
Commissioner of Patents